(12) United States Patent
Baretich

(10) Patent No.: US 11,402,862 B2
(45) Date of Patent: Aug. 2, 2022

(54) MICRO-STEPPING CASCADING VOLTAGE REGULATOR

(71) Applicant: David Baretich, Wilsonville, OR (US)

(72) Inventor: David Baretich, Wilsonville, OR (US)

( * ) Notice: Subject to any disclaimer, the term of this patent is extended or adjusted under 35 U.S.C. 154(b) by 0 days.

(21) Appl. No.: 15/959,204

(22) Filed: Apr. 21, 2018

(65) Prior Publication Data

US 2022/0035395 A1 Feb. 3, 2022

(51) Int. Cl.
  *G05F 3/04* (2006.01)
  *H02J 3/18* (2006.01)
  *G05F 1/14* (2006.01)

(52) U.S. Cl.
  CPC ............. *G05F 3/04* (2013.01); *H02J 3/1878* (2013.01); *G05F 1/14* (2013.01)

(58) Field of Classification Search
  CPC ..... G05F 1/12; G05F 1/14; G05F 1/16; G05F 1/20; H02J 3/1878
  See application file for complete search history.

(56) References Cited

U.S. PATENT DOCUMENTS

| | | | |
|---|---|---|---|
| 2015/0286227 A1* | 10/2015 | Watanabe | H02J 3/1878 323/340 |
| 2016/0077534 A1* | 3/2016 | Carlen | H01F 29/04 323/340 |

* cited by examiner

*Primary Examiner* — Gary L Laxton
(74) *Attorney, Agent, or Firm* — Patrick M Dwyer

(57) ABSTRACT

A cascading tap changing regulator has a set of input taps to power both stages of the cascade, each stage having its own series injection transformer to regulate the output. A set of switches are selectively engagable in respective on-off modes to effect a number of regulation steps, and a ratio of the number of steps to the number of switches in the set is greater than 1:1.

3 Claims, 10 Drawing Sheets

MICRO-STEPPING CASCADING VOLTAGE REGULATOR

CROSS REFERENCE TO RELATED APPLICATIONS

This application claims priority to U.S. Provisional Patent application 62/488,305 filed Apr. 21, 2017 which is hereby incorporated by this reference as if fully set forth herein.

BACKGROUND

A common form of AC voltage regulation has been provided by so called tap changing regulators. These are used in a variety of applications, from low voltage AC regulation for individual appliances, up to medium voltage utility transformers. They are some of the simplest regulators in terms of circuit complexity. However, they suffer from either lack of sufficient regulation granularity for many applications, or sufficient regulating range.

For a typical tap changer using electronic switches (such as thyristor, MOSFET, IGBT, etc.), a transformer tap and a bidirectional switch is required for each step in voltage. For example, some regulators will limit to five taps at 2% intervals (reference Legend Power Systems) for a typical regulating range of +2% to −6% of input voltage. Other regulators regulate over a wide voltage range, but with very coarse regulations steps of more than 10% (reference Koblenz, Tripp-Lite).

Medium voltage utility tap changing transformers typically use mechanical tap switching mechanism and can implement half-taps. This reduces the number of required taps approximately in half. However, mechanical tap changers are slow in response and wear out over time. For reference, a typical utility regulator might have 16 taps, with half-taps at 0.625%, for a total of +/−10% regulation range.

An electronic version with this capability will require 33 taps and 33 electronic switches. That is, 16 each positive, 16 each negative, and one for 0%.

Coarse regulation, while better than nothing, still has significant disadvantages regarding power quality. A large step voltage (1% or greater) on the output can cause detectable flicker in downstream lighting and cause VAR compensating capacitors to resonate. Because of this, the frequency of tap changes and their step size must be minimized. Both of these considerations are becoming larger issues as utilities are forced to integrate ever increasing amounts of reverse power flow from Distributed Energy Resources (DER) which creates a new class of voltage compliance problems. A second issue is the inability to optimize voltage as precisely as desired.

A third issue is the inability of a coarsely regulated tap changer to provide precise control within each cycle to correct the AC waveform, reduce harmonics, and dampen resonances in the AC system.

Electronic power controllers and inverters have eliminated this lack of granularity and slow response by using high frequency pulse width modulation (PWM) techniques. However, these controllers are more complex and create radio frequency interference that must be filtered. Because the largest and highest voltage electronic switches available are typically not as fast as smaller ones, the maximum power capability of PWM designs is limited, as a practical matter. Furthermore, because of high frequency switching losses and inductor core losses, efficiency is reduced. So for many applications, a tap changing regulator would be an attractive option if it is made to respond with similar speed and precision as that of a high frequency converter.

It would therefore be highly beneficial to have a tap changing regulator that uses significantly fewer taps and switches to accomplish a desired regulation range and precision. In other words, a tap changing regulator with a greater number of micro-steps in regulation range than the number of switches employed to effect the full regulation range. This relationship can be stated as a ratio of micro-steps to switches that is greater than unity, or 1:1. Desirably, the ratio is greater than 2:1 and advantageously greater than 4:1.

It would also be further beneficial for that tap changing regulator to have precision and response time that is similar to high frequency modulated converters such as inverters and direct AC-AC converters.

Another issue where improvement is needed is commutation of switches in tap changing regulators. With electronic switches such as IGBTs, MOSFETs, and thyristors with turn-off capability, this normally involves turning off one tap before turning on the next one (dead time). However, it leaves no path for current to travel during the dead time, resulting in excessive voltage across the switches. Typically, some sort of voltage clamp or snubber is used to limit voltage on the switches during this time. However, snubbers and clamps add cost and often exhibit excessive power dissipation, especially when switching at higher rates (multiple times per cycle).

It would therefore be highly beneficial to have a commutation method for multiple tap changing regulators that does not require voltage clamps or snubbers, and has reduced power dissipation.

None of these issues have been adequately, if at all, addressed in the prior art. For example U.S. Pat. No. 5,373,433 to Trace Engineering shows an inverter application where successive voltage steps and stages of smaller size can be added and subtracted to gain finer resolution of the output voltage in the inverter. However, each stage has only +/−1 step in capability. This limits the effective resolution gain of each additional section implemented or cascaded in the inverter. U.S. Pat. No. 8,035,358 to Superior Electric shows an AC regulator based upon a similar idea. However, it has the same limitations as our U.S. Pat. No. 5,373,433 in that a large number of stages are still required to achieve a higher number of steps.

DISCLOSURE

A surprising and unique combination and topology of transformer voltage taps and switches combines to create a much larger number of voltage steps than would be provided by a given number of switches in conventional regulators. This allows for smaller adjustment steps (micro-stepping) and a wider total adjustment range in a tap changing regulator, which also provides significant advantages in terms of reduced parts count, simplified magnetics, increased reliability, and all with faster and more precise regulation.

Definitions

A "switch" (including electronic switches) is defined as a bidirectional switch that may be made up of thyristors, MOSFETs, IGBTs, BJTs, or any other electronically controllable switch, including gas discharge tubes as well as any other such technology now known or later developed. If the switch is a semiconductor, it may employ silicon, silicon carbide, gallium nitride, as well as any other such semiconductor now known or later developed. Mechanical switches such as relays or contactors are contemplated as well.

For the purposes of this application, all switches—mechanical, electronic, semiconductor, or otherwise—are represented by a simple switch symbol because the disclosed technology works with many kinds of switches, and to simplify the schematics for ease of discussion. Examples of some possible forms of electronic switches are provided in FIG. 1.

Low voltage AC is generally voltage below 1000 VAC, in either single phase or three phase configuration. It may be 50 Hz, 60 Hz, or up to 1 kHz or more for aircraft or similar operation.

Medium voltage AC is generally in the range of 1000 VAC to 38 kVAC.

High voltage AC is generally above 38 kVAC.

Voltage taps and electronic switches are disclosed in unique configurations, along with a unique and advantageous commutation method. These configurations increase the number of regulation steps within in a given voltage range, as compared with the number of taps and switches used in the prior art for the same or similar ranges. Furthermore, these configurations are beneficial when used in cascade, the cascade having for example a combination of larger steps and smaller ones, so to create an even greater multiplication of steps per tap and switch as well as smaller step sizes (smaller voltage steps than in conventional devices).

DETAILED DESCRIPTION

Figure 1:
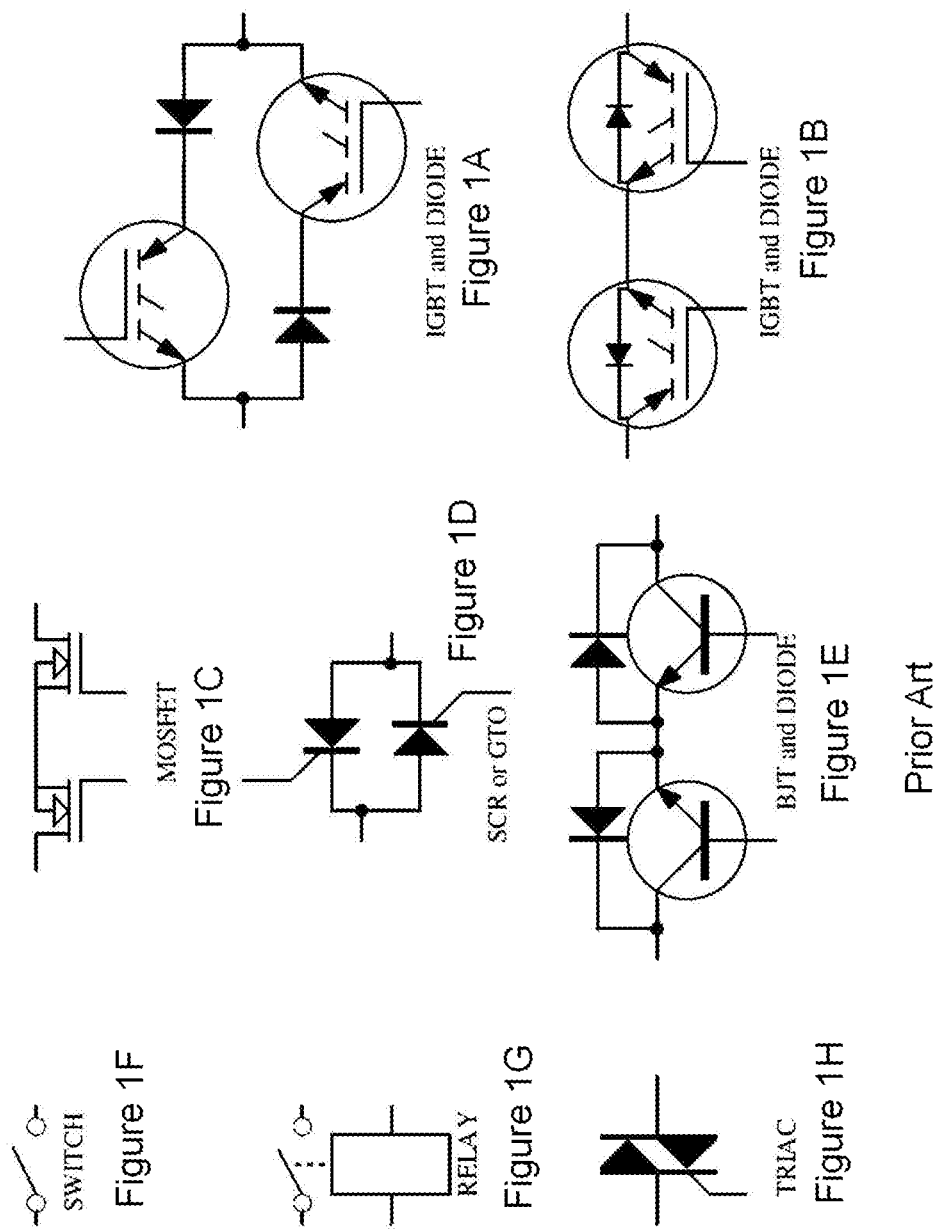
FIGS. 1A-H are schematic representations for each of several typical switches.
Figure 2:
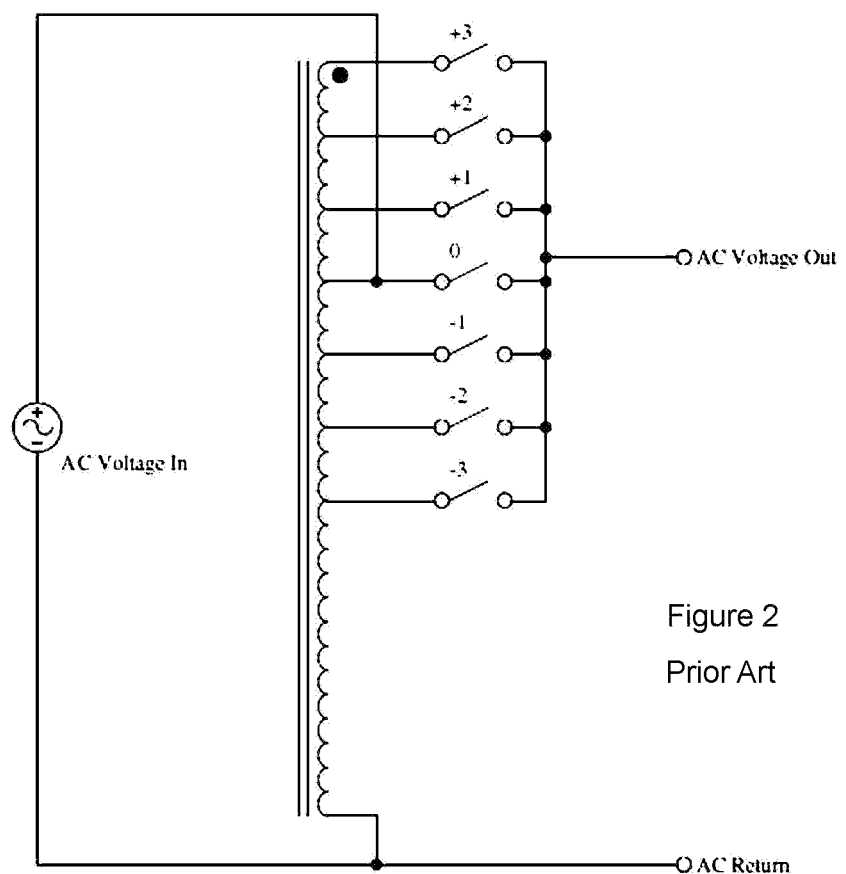
FIG. 2 is a schematic representation of a typical prior art tap changing regulator.

FIG. 2 shows a typical prior art tap changing regulator. For a regulator with 7 output taps and 7 switches, a regulating range of +3 steps, 0% step, and −3 steps can be implemented.

Figure 3:
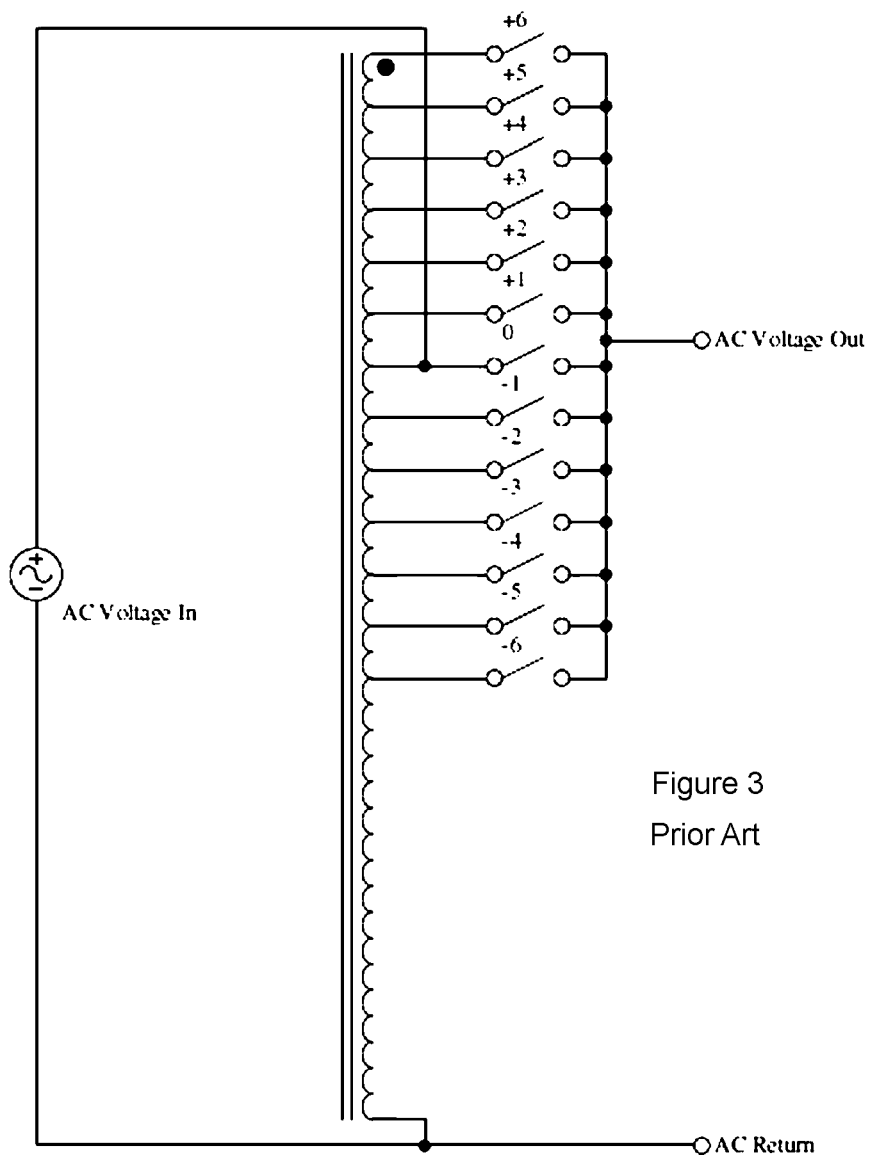
FIG. 3 is a schematic representation of an alternate prior art tap changing regulator.

FIG. 3 shows another typical prior art tap changing regulator. This one has a total of 13 taps and switches, for +6 steps, 0% step, and −6 steps. For discussion, we will call this a +/−6 step range, with the 0% step included.

Figure 4:
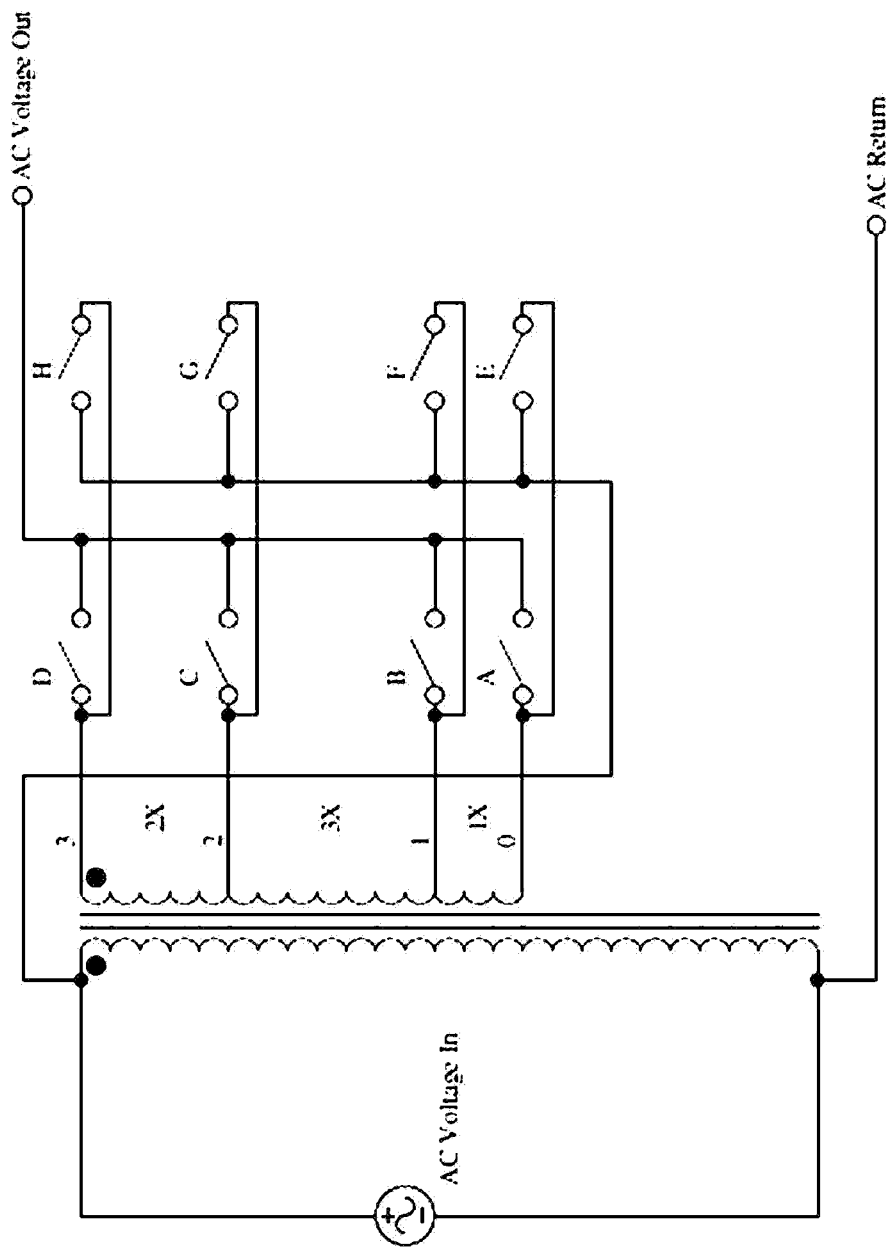
FIG. 4 is a schematic representation of one disclosed topology.

FIG. 4 shows one implementation of the invention. It consists of a top winding with a voltage ratio of 2×, a bottom winding of 1×, and a middle winding of 3×. Using this configuration, a total range of +/−6 steps is effected as shown in Table 1.

TABLE 1

Switch closures for regulating +/−6 steps.

| Step Value | Switches Closed |
|---|---|
| 0 | A-E, B-F, C-G, or D-H |
| +1 | B-E |
| +2 | D-G |
| +3 | C-F |
| +4 | C-E |
| +5 | D-F |
| +6 | D-E |
| −1 | A-F |
| −2 | C-H |
| −3 | B-G |
| −4 | A-G |
| −5 | B-H |
| −6 | A-H |

A comparison in number of taps and switches between prior art and current disclosure is in Table 2. A surprising and significant advantage is gained as the desired number of steps increases for a single tap section without cascading.

TABLE 2

Comparison of methods

Figure 5:
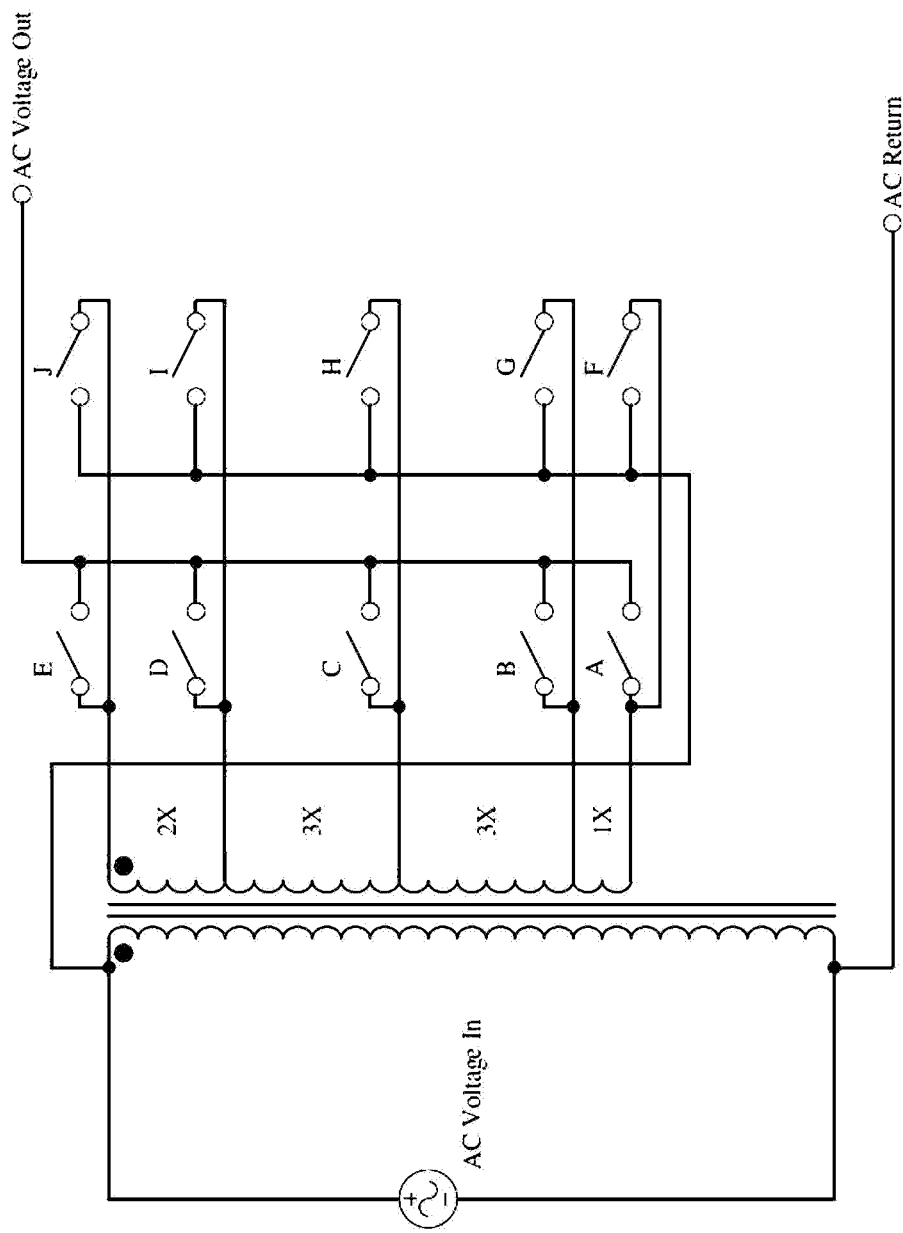
FIG. 5 is a circuit schematic of an aspect of the disclosure.
Figure 6:
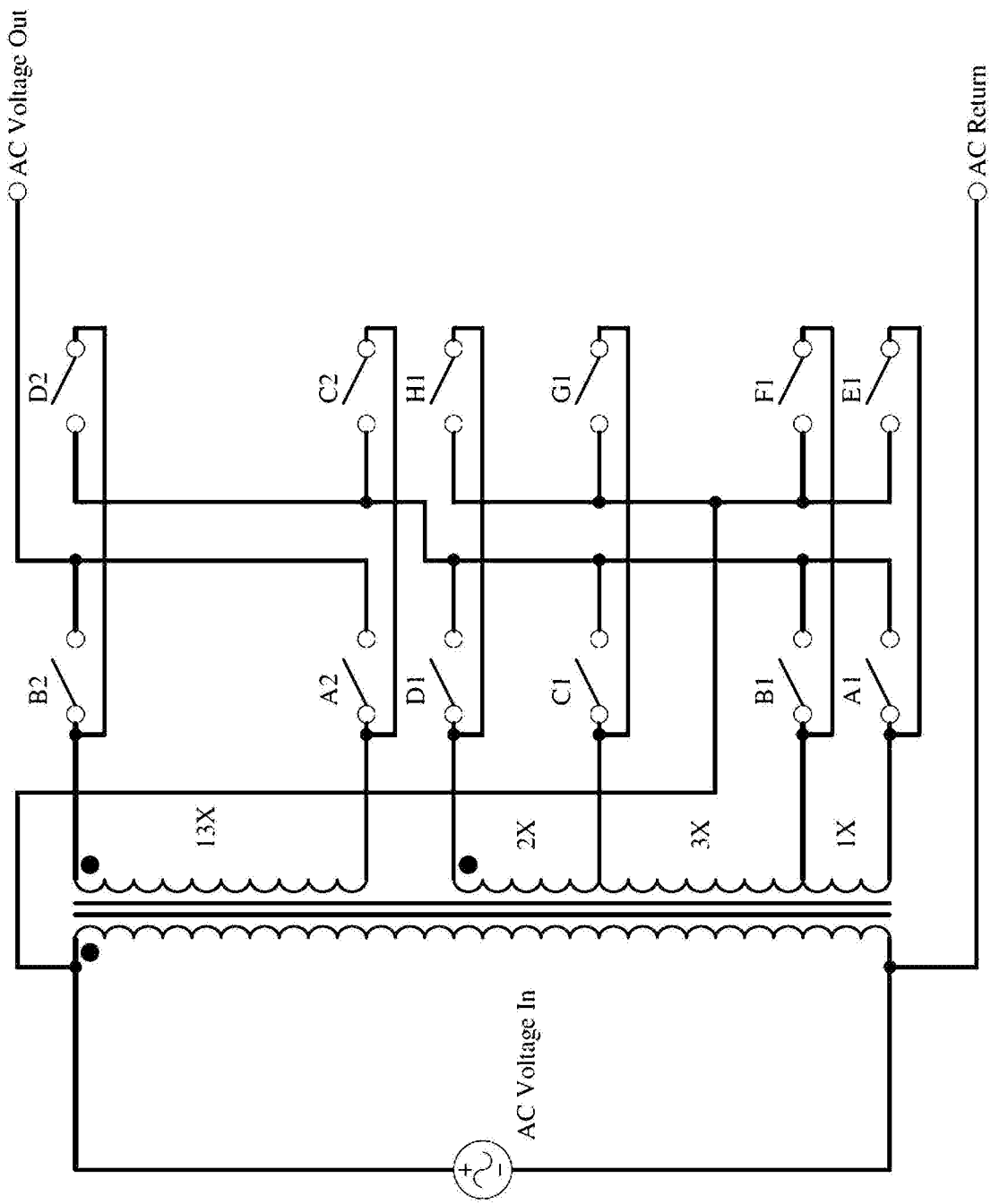
FIG. 6 is a circuit schematic of a configuration with two stages cascaded together.
Figure 7:
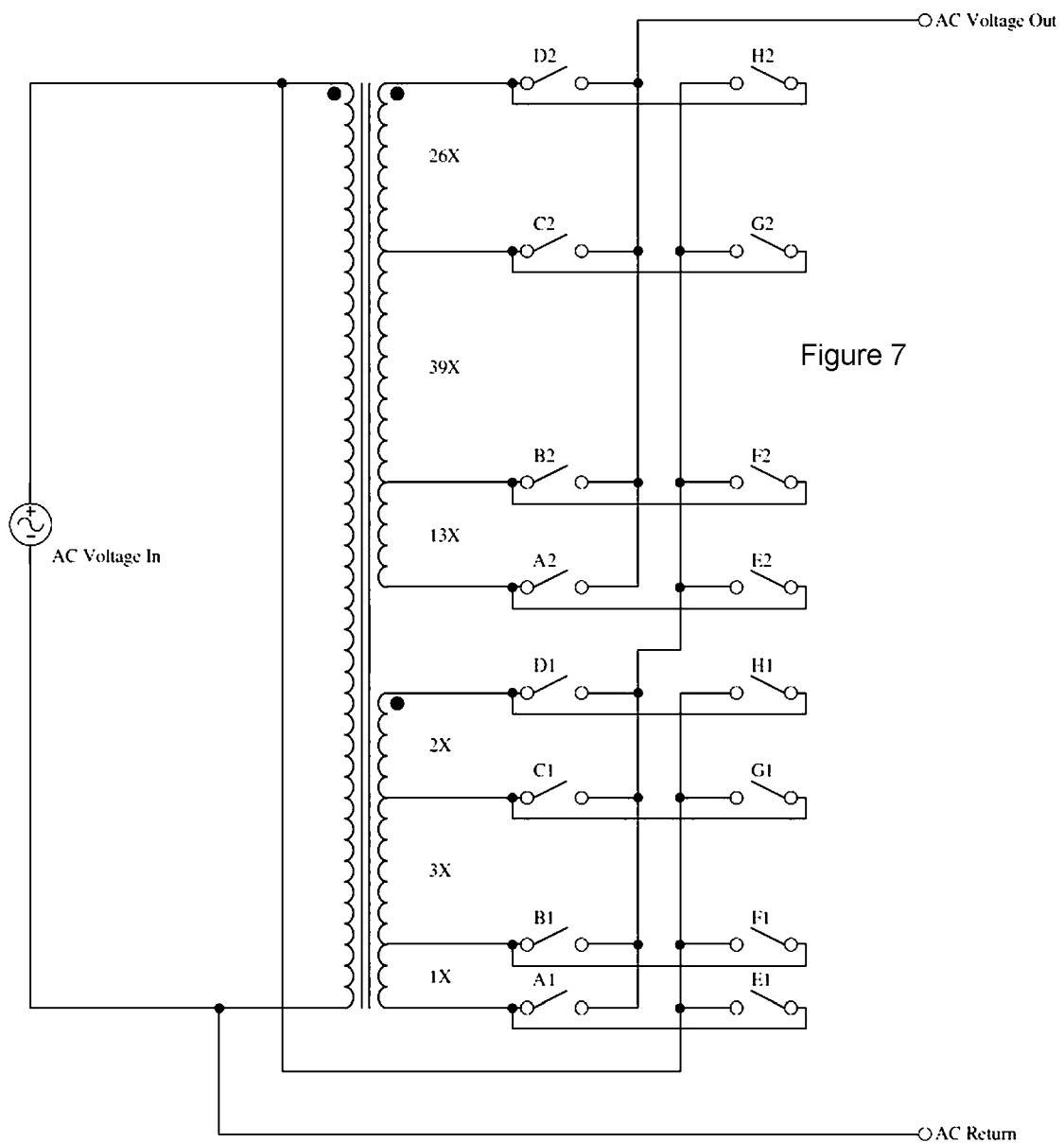
FIG. 7 is a schematic views of aspects of the disclosure.

| Method | Step range | No. of taps | No. of switches |
|---|---|---|---|
| FIG. 3 (Prior Art) | +/−6 steps | 13 | 13 |
| FIG. 4 | +/−6 steps | 4 | 8 |
| FIG. 5 | +/−9 steps | 5 | 10 |
| FIG. 6 | +/−19 steps | 6 | 12 |
| FIG. 7 | +/−84 steps | 8 | 16 |

FIG. 5 shows another embodiment of the invention. This adds a second 3× winding in the middle, along with an additional pair of switches. This enables a total of +/−9 steps with 10 switches as is shown in Table 3. It is further contemplated that additional windings of 3× voltage steps are inserted into the transformer winding for increase of total number of steps.

TABLE 3

Switch closures for regulating +/−9 steps.

| Step Value | Switches Closed |
|---|---|
| 0 | A-F, B-G, C-H, D-I, or E-J |
| +1 | B-F |
| +2 | E-I |
| +3 | C-G or D-H |
| +4 | C-F |
| +5 | E-H |
| +6 | D-G |
| +7 | D-F |
| +8 | E-G |
| +9 | E-F |
| −1 | A-G |
| −2 | D-J |
| −3 | B-H or C-I |
| −4 | A-H |
| −5 | C-J |
| −6 | B-I |
| −7 | A-I |
| −8 | B-J |
| −9 | A-J |

These embodiments further increase in advantage over the prior art by cascading two or more regulator sections in series, effectively multiplying the steps with respect to the number of taps and switches.

FIG. 6 discloses a configuration with two stages cascaded together. More stages are cascaded for more total steps. FIG. 6 is a +/−6 step implementation combined with a +/−1 step bridge. In this case, the turns ratio of the single step bridge is 13×. Total possible steps are +/−19 with 12 switches as shown below in Table 4.

TABLE 4

| Stage 1 steps (1X) | Stage 2 steps (13X) | Total steps | Switches Closed Stage 1 | Switches Closed Stage 2 |
|---|---|---|---|---|
| Positive Steps | | | | |
| 0 | 0 | 0 | A1-E1 | A2-C2 |
| +1 | 0 | +1 | B1-E1 | A2-C2 |
| +2 | 0 | +2 | D1-G1 | A2-C2 |
| +3 | 0 | +3 | C1-F1 | A2-C2 |
| +4 | 0 | +4 | C1-E1 | A2-C2 |
| +5 | 0 | +5 | D1-F1 | A2-C2 |
| +6 | 0 | +6 | D1-E1 | A2-C2 |
| −6 | +1 | +7 | A1-H1 | B2-C2 |
| −5 | +1 | +8 | B1-H1 | B2-C2 |
| −4 | +1 | +9 | A1-G1 | B2-C2 |
| −3 | +1 | +10 | B1-G1 | B2-C2 |
| −2 | +1 | +11 | C1-H1 | B2-C2 |
| −1 | +1 | +12 | A1-F1 | B2-C2 |
| 0 | +1 | +13 | A1-E1 | B2-C2 |
| +1 | +1 | +14 | B1-E1 | B2-C2 |
| +2 | +1 | +15 | D1-G1 | B2-C2 |
| +3 | +1 | +16 | C1-F1 | B2-C2 |
| +4 | +1 | +17 | C1-E1 | B2-C2 |
| +5 | +1 | +18 | D1-F1 | B2-C2 |
| +6 | +1 | +19 | D1-E1 | B2-C2 |
| Negative Steps | | | | |
| 0 | 0 | 0 | A1-E1 | A2-C2 |
| −1 | 0 | −1 | A1-F1 | A2-C2 |
| −2 | 0 | −2 | C1-H1 | A2-C2 |
| −3 | 0 | −3 | B1-G1 | A2-C2 |
| −4 | 0 | −4 | A1-G1 | A2-C2 |
| −. | 0 | −5 | B1-H1 | A2-C2 |
| −6 | 0 | −6 | A1-H1 | A2-C2 |
| +6 | −1 | −7 | D1-E1 | A2-D2 |
| +5 | −1 | −8 | D1-F1 | A2-D2 |
| +4 | −1 | −9 | C1-E1 | A2-D2 |
| +3 | −1 | −10 | C1-F1 | A2-D2 |
| +2 | −1 | −11 | D1-G1 | A2-D2 |
| +1 | −1 | −12 | B1-E1 | A2-D2 |
| 0 | −1 | −13 | A1-E1 | A2-D2 |
| −1 | −1 | −14 | A1-F1 | A2-D2 |
| −2 | −1 | −15 | C1-H1 | A2-D2 |
| 3 | −1 | −16 | B1-G1 | A2-D2 |
| −4 | −1 | −17 | A1-G1 | A2-D2 |
| −5 | −1 | −18 | B1-H1 | A2-D2 |
| −6 | −1 | −19 | A1-H1 | A2-D2 |

FIG. 7 is two +/−6 step implementations cascaded together. In this case, the single step turns ratio of Stage 1 is 1× and the single step turns ratio of Stage 2 is 13×. Total possible steps are +/−84 with 16 switches as shown below in Table 5.

TABLE 5

Switch closures for +/−84 Step Regulator

| Stage 1 steps (1X) | Stage 2 steps (13X) | Total steps | Switches Closed Stage 1 | Switches Closed Stage 2 |
|---|---|---|---|---|
| Positive Steps | | | | |
| 0 | 0 | 0 | A1-E1 | A2-E2 |
| +1 | 0 | +1 | B1-E1 | A2-E2 |
| +2 | 0 | +2 | D1-G1 | A2-E2 |
| +3 | 0 | +3 | C1-F1 | A2-E2 |
| +4 | 0 | +4 | C1-E1 | A2-E2 |
| +5 | 0 | +5 | D1-F1 | A2-E2 |
| +6 | 0 | +6 | D1-E1 | A2-E2 |
| −6 | +1 | +7 | A1-H1 | B2-E2 |
| −5 | +1 | +8 | B1-H1 | B2-E2 |
| −4 | +1 | +9 | A1-G1 | B2-E2 |
| −3 | +1 | +10 | B1-G1 | B2-E2 |
| −2 | +1 | +11 | C1-H1 | B2-E2 |
| −1 | +1 | +12 | A1-F1 | B2-E2 |
| 0 | +1 | +13 | A1-E1 | B2-E2 |
| +1 | +1 | +14 | B1-E1 | B2-E2 |
| +2 | +1 | +15 | D1-G1 | B2-E2 |
| +3 | +1 | +16 | C1-F1 | B2-E2 |
| +4 | +1 | +17 | C1-E1 | B2-E2 |
| +5 | +1 | +18 | D1-F1 | B2-E2 |
| +6 | +1 | +19 | D1-E1 | B2-E2 |
| −6 | +2 | +20 | A1-H1 | D2-G2 |
| −5 | +2 | +21 | B1-H1 | D2-G2 |
| −4 | +2 | +22 | A1-G1 | D2-G2 |
| −3 | +2 | +23 | B1-G1 | D2-G2 |
| −2 | +2 | +24 | C1-H1 | D2-G2 |
| −1 | +2 | +25 | A1-F1 | D2-G2 |
| 0 | +2 | +26 | A1-E1 | D2-G2 |
| +1 | +2 | +27 | B1-E1 | D2-G2 |
| +2 | +2 | +28 | D1-G1 | D2-G2 |
| +3 | +2 | +29 | C1-F1 | D2-G2 |
| +4 | +2 | +30 | C1-E1 | D2-G2 |
| +5 | +2 | +31 | D1-F1 | D2-G2 |
| +6 | +2 | +32 | D1-E1 | D2-G2 |
| −6 | +3 | +33 | A1-H1 | C2-F2 |
| −5 | +3 | +34 | B1-H1 | C2-F2 |
| −4 | +3 | +35 | A1-G1 | C2-F2 |
| −3 | +3 | +36 | B1-G1 | C2-F2 |
| −2 | +3 | +37 | C1-H1 | C2-F2 |
| −1 | +3 | +38 | A1-F1 | C2-F2 |
| 0 | +3 | +39 | A1-E1 | C2-F2 |
| +1 | +3 | +40 | B1-E1 | C2-F2 |
| +2 | +3 | +41 | D1-G1 | C2-F2 |
| +3 | +3 | +42 | C1-F1 | C2-F2 |
| +4 | +3 | +43 | C1-E1 | C2-F2 |
| +5 | +3 | +44 | D1-F1 | C2-F2 |
| +6 | +3 | +45 | D1-E1 | C2-F2 |
| −6 | +4 | +46 | A1-H1 | C2-E2 |
| −5 | +4 | +47 | B1-H1 | C2-E2 |
| −4 | +4 | +48 | A1-G1 | C2-E2 |
| −3 | +4 | +49 | B1-G1 | C2-E2 |
| −2 | +4 | +50 | C1-H1 | C2-E2 |
| −1 | +4 | +51 | A1-F1 | C2-E2 |
| 0 | +4 | +52 | A1-E1 | C2-E2 |
| +1 | +4 | +53 | B1-E1 | C2-E2 |
| +2 | +4 | +54 | D1-G1 | C2-E2 |
| +3 | +4 | +55 | C1-F1 | C2-E2 |
| +4 | +4 | +56 | C1-E1 | C2-E2 |
| +5 | +4 | +57 | D1-F1 | C2-E2 |
| +6 | +4 | +58 | D1-E1 | C2-E2 |
| −6 | +5 | +59 | A1-H1 | D2-F2 |
| −5 | +5 | +60 | B1-H1 | D2-F2 |
| −4 | +5 | +61 | A1-G1 | D2-F2 |
| −3 | +5 | +62 | B1-G1 | D2-F2 |
| −2 | +5 | +63 | C1-H1 | D2-F2 |
| −1 | +5 | +64 | A1-F1 | D2-F2 |
| 0 | +5 | +65 | A1-E1 | D2-F2 |
| +1 | +5 | +66 | B1-E1 | D2-F2 |
| +2 | +5 | +67 | D1-G1 | D2-F2 |
| +3 | +5 | +68 | C1-F1 | D2-F2 |
| +4 | +5 | +69 | C1-E1 | D2-F2 |
| +5 | +5 | +70 | D1-F1 | D2-F2 |
| +6 | +5 | +71 | D1-E1 | D2-F2 |

TABLE 5-continued

Switch closures for +/−84 Step Regulator

| Stage 1 steps (1X) | Stage 2 steps (13X) | Total steps | Switches Closed Stage 1 | Switches Closed Stage 2 |
|---|---|---|---|---|
| −6 | +6 | +72 | A1-H1 | D2-E2 |
| −5 | +6 | +73 | B1-H1 | D2-E2 |
| −4 | +6 | +74 | A1-G1 | D2-E2 |
| −3 | +6 | +75 | B1-G1 | D2-E2 |
| −2 | +6 | +76 | C1-H1 | D2-E2 |
| −1 | +6 | +77 | A1-F1 | D2-E2 |
| 0 | +6 | +78 | A1-E1 | D2-E2 |
| +1 | +6 | +79 | B1-E1 | D2-E2 |
| +2 | +6 | +80 | D1-G1 | D2-E2 |
| +3 | +6 | +81 | C1-F1 | D2-E2 |
| +4 | +6 | +82 | C1-E1 | D2-E2 |
| +5 | +6 | +83 | D1-F1 | D2-E2 |
| +6 | +6 | +84 | D1-E1 | D2-E2 |
| Negative Steps | | | | |
| 0 | 0 | 0 | A1-E1 | A2-E2 |
| −1 | 0 | −1 | A1-F1 | A2-E2 |
| −2 | 0 | −2 | C1-H1 | A2-E2 |
| −3 | 0 | −3 | B1-G1 | A2-E2 |
| −4 | 0 | −4 | A1-G1 | A2-E2 |
| −5 | 0 | −5 | B1-H1 | A2-E2 |
| −6 | 0 | −6 | A1-H1 | A2-E2 |
| +6 | −1 | −7 | D1-E1 | A2-F2 |
| +5 | −1 | −8 | D1-F1 | A2-F2 |
| +4 | −1 | −9 | C1-E1 | A2-F2 |
| +3 | −1 | −10 | C1-F1 | A2-F2 |
| +2 | −1 | −11 | D1-G1 | A2-F2 |
| +1 | −1 | −12 | B1-E1 | A2-F2 |
| 0 | −1 | −13 | A1-E1 | A2-F2 |
| −1 | −1 | −14 | A1-F1 | A2-F2 |
| −2 | −1 | −15 | C1-H1 | A2-F2 |
| −3 | −1 | −16 | B1-G1 | A2-F2 |
| −4 | −1 | −17 | A1-G1 | A2-F2 |
| −5 | −1 | −18 | B1-H1 | A2-F2 |
| −6 | −1 | −19 | A1-H1 | A2-F2 |
| +6 | −2 | −20 | D1-E1 | C2-H2 |
| +5 | −2 | −21 | D1-F1 | C2-H2 |
| +4 | −2 | −22 | C1-E1 | C2-H2 |
| +3 | −2 | −23 | C1-F1 | C2-H2 |
| +2 | −2 | −24 | D1-G1 | C2-H2 |
| +1 | −2 | −25 | B1-E1 | C2-H2 |
| 0 | −2 | −26 | A1-E1 | C2-H2 |
| −1 | −2 | −27 | A1-F1 | C2-H2 |
| −2 | −2 | −28 | C1-H1 | C2-H2 |
| −3 | −2 | −29 | B1-G1 | C2-H2 |
| −4 | −2 | −30 | A1-G1 | C2-H2 |
| −5 | −2 | −31 | B1-H1 | C2-H2 |
| −6 | −2 | −32 | A1-H1 | C2-H2 |
| +6 | −3 | −33 | D1-E1 | B2-G2 |
| +5 | −3 | −34 | D1-F1 | B2-G2 |
| +4 | −3 | −35 | C1-E1 | B2-G2 |
| +3 | −3 | −36 | C1-F1 | B2-G2 |
| +2 | −3 | −37 | D1-G1 | B2-G2 |
| +1 | −3 | −38 | B1-E1 | B2-G2 |
| 0 | −3 | −39 | A1-E1 | B2-G2 |
| −1 | −3 | −40 | A1-F1 | B2-G2 |
| −2 | −3 | −41 | C1-H1 | B2-G2 |
| −3 | −3 | −42 | B1-G1 | B2-G2 |
| −4 | −3 | −43 | A1-G1 | B2-G2 |
| −5 | −3 | −44 | B1-H1 | B2-G2 |
| −6 | −3 | −45 | A1-H1 | B2-G2 |
| +6 | −4 | −46 | D1-E1 | A2-G2 |
| +5 | −4 | −47 | D1-F1 | A2-G2 |
| +4 | −4 | −48 | C1-E1 | A2-G2 |
| +3 | −4 | −49 | C1-F1 | A2-G2 |
| +2 | −4 | −50 | D1-G1 | A2-G2 |
| +1 | −4 | −51 | B1-E1 | A2-G2 |
| 0 | −4 | −52 | A1-E1 | A2-G2 |
| −1 | −4 | −53 | A1-F1 | A2-G2 |
| −2 | −4 | −54 | C1-H1 | A2-G2 |
| −3 | −4 | −55 | B1-G1 | A2-G2 |
| −4 | −4 | −56 | A1-G1 | A2-G2 |
| −5 | −4 | −57 | B1-H1 | A2-G2 |
| −6 | −4 | −58 | A1-H1 | A2-G2 |
| +6 | −5 | −59 | D1-E1 | B2-H2 |
| +5 | −5 | −60 | D1-F1 | B2-H2 |
| +4 | −5 | −61 | C1-E1 | B2-H2 |
| +3 | −5 | −62 | C1-F1 | B2-H2 |
| +2 | −5 | −63 | D1-G1 | B2-H2 |
| +1 | −5 | −64 | B1-E1 | B2-H2 |
| 0 | −5 | −65 | A1-E1 | B2-H2 |
| −1 | −5 | −66 | A1-F1 | B2-H2 |
| −2 | −5 | −67 | C1-H1 | B2-H2 |
| −3 | −5 | −68 | B1-G1 | B2-H2 |
| −4 | −5 | −69 | A1-G1 | B2-H2 |
| −5 | −5 | −70 | B1-H1 | B2-H2 |
| −6 | −5 | −71 | A1-H1 | B2-H2 |
| +6 | −6 | −72 | D1-E1 | A2-H2 |
| +5 | −6 | −73 | D1-F1 | A2-H2 |
| +4 | −6 | −74 | C1-E1 | A2-H2 |
| +3 | −6 | −75 | C1-F1 | A2-H2 |
| +2 | −6 | −76 | D1-G1 | A2-H2 |
| +1 | −6 | −77 | B1-E1 | A2-H2 |
| 0 | −6 | −78 | A1-E1 | A2-H2 |
| −1 | −6 | −79 | A1-F1 | A2-H2 |
| −2 | −6 | −80 | C1-H1 | A2-H2 |
| −3 | −6 | −81 | B1-G1 | A2-H2 |
| −4 | −6 | −82 | A1-G1 | A2-H2 |
| −5 | −6 | −83 | B1-H1 | A2-H2 |
| −6 | −6 | −84 | A1-H1 | A2-H2 |

The number of steps is increased even more by either using stages with more steps, or by cascading more stages.

Figure 8:
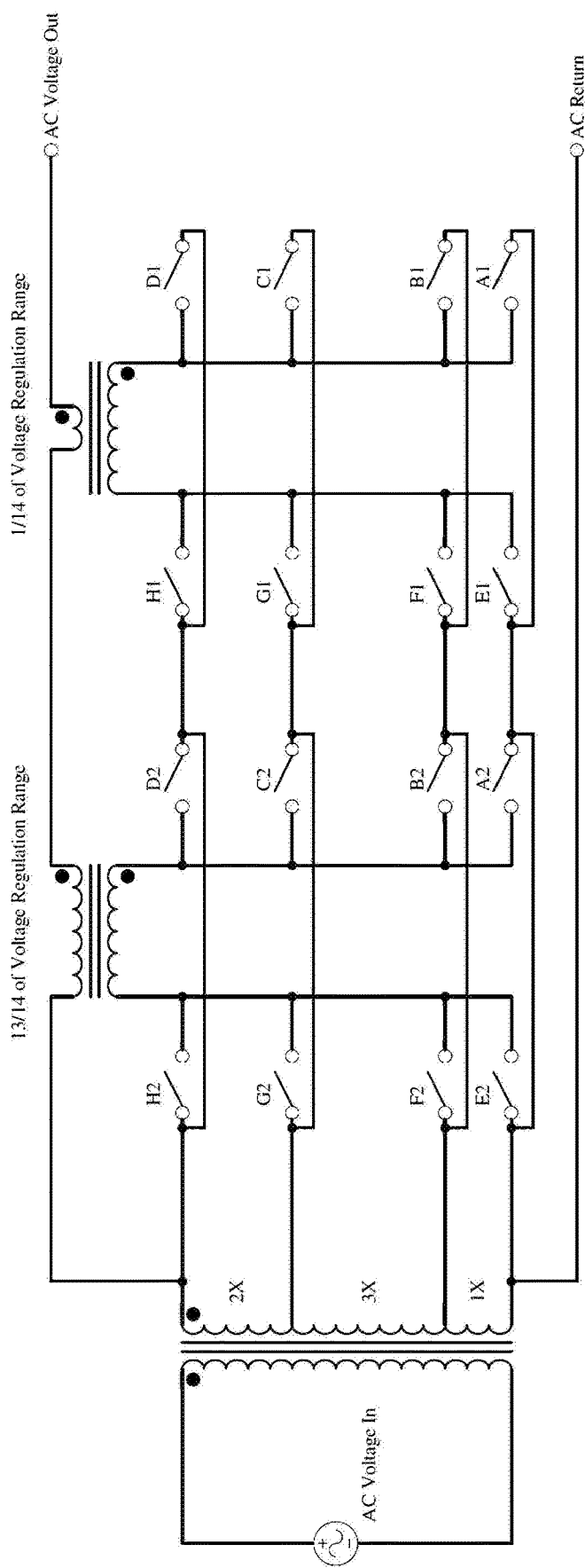
FIG. 8 is a schematic views of aspects of the disclosure.
Figure 9:
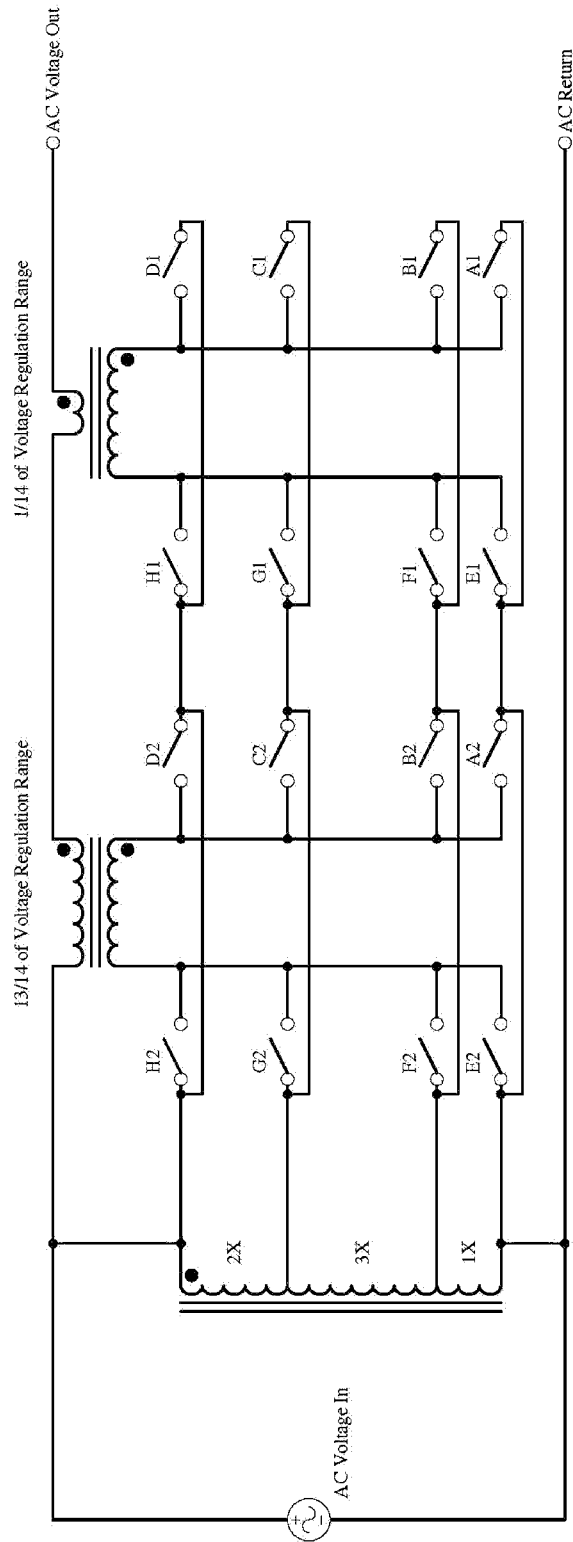
FIG. 9 is a schematic views of aspects of the disclosure.

Two embodiments are shown in FIGS. 8 and 9. These use a set of input taps to power both stages of the cascade. Each stage employs its own series injection transformer to regulate the output. These series injection transformers are sized in ratio and voltage output to add and subtract as previously shown. One advantage of these configurations is to allow high current output regulation from lower current switches FIG. 8 shows an isolated +/−84 step regulating transformer with low voltage output, which is useful in a utility application with a low or medium voltage input. FIG. 9 shows a low voltage, non-isolated +/−84 step regulator, which is useful to regulate AC voltage of a building or buildings, or regulating low to medium voltage AC branch circuits. The voltage taps in this case are advantageously provided by an autotransformer.

Advantageously, the various illustrated and tabularized switch topologies and on-off states are controlled by microprocessor employing a set of instructions that are executed such that switch states in a given topology and voltage and or current conditions in the respective topology are continuously monitored in real time so that switch states are changed instantaneously in response to changing voltage and or current conditions for maximum effective operation.

For applications such as this, both stages typically operate from the same input voltages. The smaller stage, however, will operate at lower current, enabling the use of smaller and lower cost switches.

Disclosed technology is implemented in either single phase or three phase applications. For three phase versions, either Wye or Delta regulation is used. In a utility application, disclosed topologies replace prior art tap changing line regulators for voltage regulation and stabilization of the grid. With the large number of available steps, the step size is reduced sufficiently to enable use as a network control transformer to control power flow between various feeders and inter-connections within the grid. This represents an alternative to phase angle shifting methods conventionally employed.

Alternately, with the large number of steps, total regulation range is extremely wide (+/−50% or more) while maintaining tight regulation. Thus, disclosed topologies are effective DVRs (Dynamic Voltage Restorers). Response to control inputs is limited only by the speed of the switches. For some applications, at steady state the regulator will only occasionally change steps. In transient conditions, it will change steps multiple times within a line cycle if desired. There is no limitation in the frequency of adjustment other than speed and allowable switching losses in the electronic switches.

Because of this, in addition to RMS voltage regulation there is the ability to adjust or correct harmonics and THD by tap selection at various points within a line cycle. It will effect ripple signal (AFLC) communications on the grid by modulating at various predetermined frequencies (typically between 175 and 1750 Hz). Depending on the control loop, it will also dampen or null out such frequencies as might exist on the grid so as not to disturb sensitive loads.

Power flow is bidirectional in the various embodiments. Thus, a configuration is Implemented in either direction or in both directions together. Voltage sensing and regulation is employed on either or both sides of the regulator to accomplish this.

Various other voltage or current control methods are employed to control the switches as will be appreciated by those skilled in the art. These include analog, digital, and mixed signal implementations. They include simple logic or microprocessor control. The adjustment or regulation is either manually or electronically controlled.

Preferred Method of Commutation

Switch commutation is effected by a variety of methods. Typically, switches are commutated in a break-before-make sequence. During the break time, peak voltages are controlled by a variety of voltage clamps, snubbers, or other similar devices. However, to minimize voltage stress on the power switches and reduce switching losses, an improved commutation method should be used.

U.S. Pat. No. 5,747,972 (MicroPlanet), incorporated herein by reference as if fully set forth, describes a commutation method that eliminates the need for voltage clamps and snubbers. However, it does not provide fully for two conditions.

The first is that it is able to switch only between two voltage levels. Because of that, it requires high speed pulse width modulation to create intermediate voltages between a low and high AC voltage input. This adds to control circuit complexity and increases electromagnetic interference. The second is the lack of an effective high impedance, or OFF mode. The output is either low, high, or somewhere in between.

Figure 10:
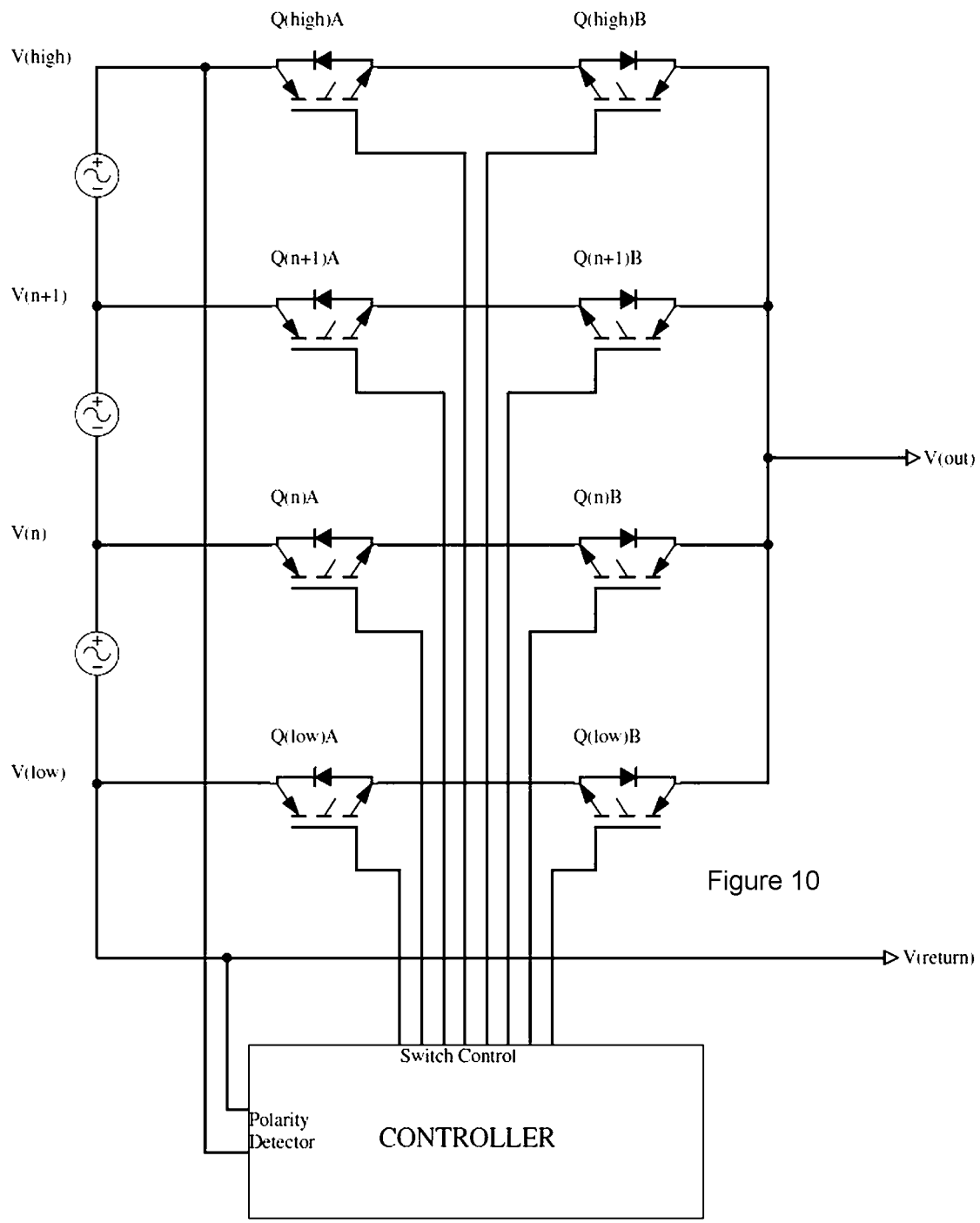
FIG. 10 is a schematic views of aspects of the disclosure.

FIG. 10 shows a circuit for changing taps between any number of multiple AC voltage levels. These voltages are supplied by independent AC sources, or from multiple taps of a transformer or autotransformer. They are of equal or varying potential in step size. The only requirements are that they are in phase, and that the intermediate voltages (V(n), V(n+1)) are between V(high) and V(low) in potential. Intermediate voltage sources number from 0 to any desired number for desired range and resolution. To put this in context, the four switches shown in FIG. 10 would be used as A1, B1, C1, & D1 in FIG. 7. Additionally, this method would also effect switching between suitable voltages such as a traditional tap changing transformer, or as an alternative to a transfer switch.

Control methodology is described in Table 6. Control circuitry senses input voltage and responds to either positive input voltage, negative input voltage, and input voltage crossover (X). Switches are either off (0) or on (1) according to the table.

TABLE 6

| | | Switching | | | | | | | |
|---|---|---|---|---|---|---|---|---|---|
| Polarity | V(out) | Q(high)A | Q(high)B | Q(n)A | Q(n)B | Q(n + 1)A | Q(n + 1)B | Q(low)A | Q(low)B |
| + | High Z | 0 | 1 | 0 | 0 | 0 | 0 | 1 | 0 |
| − | High Z | 1 | 0 | 0 | 0 | 0 | 0 | 0 | 1 |
| X | High Z | 1 | 1 | 0 | 0 | 0 | 0 | 1 | 1 |
| + | V(low) | 0 | 1 | 0 | 0 | 0 | 0 | 1 | 1 |
| − | V(low) | 1 | 0 | 0 | 0 | 0 | 0 | 1 | 1 |
| X | V(low) | 1 | 1 | 0 | 0 | 0 | 0 | 1 | 1 |
| + | V(n) | 0 | 1 | 1 | 1 | 0 | 0 | 1 | 0 |
| − | V(n) | 1 | 0 | 1 | 1 | 0 | 0 | 0 | 1 |
| X | V(n) | 1 | 1 | 1 | 1 | 0 | 0 | 1 | 1 |
| + | V(n + 1) | 0 | 1 | 0 | 0 | 1 | 1 | 1 | 0 |
| − | V(n + 1) | 1 | 0 | 0 | 0 | 1 | 1 | 0 | 1 |
| X | V(n + 1) | 1 | 1 | 0 | 0 | 1 | 1 | 0 | 0 |
| + | V(high) | 1 | 1 | 0 | 0 | 0 | 0 | 1 | 0 |
| − | V(high) | 1 | 1 | 0 | 0 | 0 | 0 | 0 | 1 |
| X | V(high) | 1 | 1 | 0 | 0 | 0 | 0 | 1 | 1 |

The purpose of this method is to reliably and quickly commutate between multiple switches where there is never excessive voltage on any of the switches, where switching losses are minimized, and where no external voltage limiting clamps, snubbers, or similar circuitry are required. To begin the description, we start with the base state.

The base state of this commutation method is the High Z state. With the switches oriented in this state, no voltage is transferred to the output except during crossover. To avoid cross conduction, the crossover state typically occurs within approximately +/−4V of the actual voltage zero crossing for IGBTs and +/−2V for MOSFET and BJT circuits.

An advantage of the High Z state is that even though no input voltage is transferred to the output, output current (such as back feed from a load) during this mode is clamped by the high and low switches so that no switch experiences overvoltage. For example, consider the high Z state with positive input polarity.

If output current is positive (quadrant 1), Q(low)A is on and output current conducts through Q(low)A IGBT and Q(low)B diode. V(out) is clamped to V(low).

If output current is negative (quadrant 2), Q(high)B is on and output current conducts through Q(high)B IGBT and Q(high)A diode. V(out) is clamped to V(high).

For negative input polarity, if output current is negative (quadrant 3), Q(low)B is on and output current conducts through Q(low)B IGBT and Q(low)A diode. V(out) is clamped to V(low).

For negative input polarity, if output current is positive (quadrant 4), Q(high)A is on and output current conducts through Q(high)A IGBT and Q(high)B diode. V(out) is clamped to V(high).

V(return) is alternately connected to any of the other voltages or to an additional voltage (as in an autotransformer) as will be appreciated by those skilled in the art.

This is a very useful feature when paralleling transformers and regulators, particularly when the regulators are operational. A second regulator is hot switched in parallel with a first if it is in High Z state and if the first voltage is greater than V(low) and less than V(high). Once regulators are connected, appropriate taps are selected to achieve current sharing among two or more regulators.

Another useful feature of High Z state is that it is useful to prioritize two parallel voltage sources in terms of providing load support. Consider a primary line source with a different line (of the same phase) serving as a secondary standby source through a regulator or transformer in High Z state. The primary source provides load power until its output voltage drops (from line Impedance drops or failure) below V(low) of the standby source. At that point, the standby source begins to source current to the load. This provides for immediate and seamless transition to and from the standby source. It also allows the standby source to be powered up and connected without having to supply load current during primary operation.

To begin voltage transfer to the output, starting from High Z State, any of the voltage levels desired are applied to the output by simply activating the appropriate switches as shown in Table 6. To switch from one level to another requires a temporary transition back to High Z state, and then to the next desired level. The transition time is very short, depending upon switch speed. For a typical IGBT circuit, it would typically be from one to several microseconds in High Z state before switching to the next level.

Because of this method, switching between levels is effected at any point in the line cycle, and at multiple points in the line cycle, with greatly reduced switching losses compared with prior art implementations.

This allows a regulator to respond instantaneously to load or control requirements. It also responds quickly and effectively during output overload and saturating transformer cores, improving system reliability.

Switching between levels is effected at a variety of desired rates, times, or frequencies. Steady state operation often requires minimal switching of levels, such as an occasional switch during voltage fluctuations. However, switching will occur multiple times per line cycle if desired to respond quickly to fast transients. Accordingly, a regulator that employs this methodology is capable of true sub-cycle response.

A further feature of this method is that different levels may be used on positive half-cycles versus negative half-cycles. Thus, the regulator induces a DC voltage offset in the power line, as well as nulling an existing system DC voltage offset. This allows continuous, reliable operation with asymmetric loads, and during solar storms such as a "Carrington Event," without saturating and degrading system transformers.

Finally, if desired, high frequency PWM techniques are employed to provide variable output voltages between taps, such as that disclosed in U.S. Pat. No. 5,747,972 (Micro-Planet). Switching between taps allows for a smaller and less expensive output filter compared to switching between only two voltages as shown in prior art.

As previously discussed, AC voltage levels are typically provided by multiple taps on a transformer or autotransformer. Because of leakage inductances inherent in transformers, an AC filter capacitor is placed between successive taps for high frequency filtering.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A tap changing regulator comprising a plurality of regulator stages disposed in series cascade, and
a set of input taps for each stage of the cascade, each stage having its own series injection transformer to regulate an output;
a set of switches in a first regulator stage, the set of switches comprising a number of switches that are selectively engageable in respective on-off modes to effect a number of regulation steps in the first regulator stage;
wherein a ratio of the number of regulation steps to the number of switches in the set of switches in the stage is greater than 1:1.

2. The regulator of claim 1 wherein the ratio is greater than 2:1.

3. The regulator of claim 1 wherein the ratio is greater than 4:1.

* * * * *